United States Patent
Wang et al.

(10) Patent No.: US 6,831,934 B2
(45) Date of Patent: Dec. 14, 2004

(54) CLADDING PUMPED FIBER LASER

(75) Inventors: Zhijiang Wang, Diamond Bar, CA (US); Ying Wang, Diamond Bar, CA (US)

(73) Assignee: Apollo Instruments, Inc., Irvine, CA (US)

( * ) Notice: Subject to any disclaimer, the term of this patent is extended or adjusted under 35 U.S.C. 154(b) by 36 days.

(21) Appl. No.: 10/147,023

(22) Filed: May 15, 2002

(65) Prior Publication Data

US 2002/0181512 A1 Dec. 5, 2002

Related U.S. Application Data

(60) Provisional application No. 60/294,092, filed on May 29, 2001.

(51) Int. Cl.[7] .................................................. H01S 3/30
(52) U.S. Cl. ............................ 372/6; 385/126; 385/127
(58) Field of Search .............................. 372/6; 385/126, 385/127

(56) References Cited

U.S. PATENT DOCUMENTS

| | | | |
|---|---|---|---|
| 4,815,079 A | | 3/1989 | Snitzer et al. |
| 5,251,062 A | * | 10/1993 | Snitzer et al. ................. 372/6 |
| 5,530,710 A | | 6/1996 | Grubb |
| 5,533,163 A | | 7/1996 | Muendel |
| 5,949,941 A | * | 9/1999 | DiGiovanni ................... 372/6 |
| 5,966,491 A | | 10/1999 | DiGiovanni |
| 6,031,849 A | | 2/2000 | Ball et al. |
| 6,157,763 A | | 12/2000 | Grubb et al. |
| 6,301,420 B1 | * | 10/2001 | Greenaway et al. ........ 385/126 |
| 2002/0141718 A1 | * | 10/2002 | Wang et al. ................. 385/127 |

OTHER PUBLICATIONS

Minelly, J.D. et al. "Diode–Array Pumping of $Er^{3+}/Yb^{3+}$ Co–Doped Fiber Lasers and Amplifiers," *IEEE Photonics Technology Letters* Mar. 1993, pp. 301–303, vol. 5, No. 3.

* cited by examiner

*Primary Examiner*—Minsun Oh Harvey
*Assistant Examiner*—Cornelius H. Jackson
(74) *Attorney, Agent, or Firm*—William Michael Hynes; Townsend and Townsend and Crew LLP

(57) ABSTRACT

A double cladding fiber includes an inner core doped with active species, an inner cladding disposed adjacent said inner core for receiving pumping energy, minimizing local modes in said inner cladding, and transferring said pumping energy to the core. An outer cladding is disposed adjacent the inner cladding. The cross section of said inner cladding has a polygon-like shape with its boundary being a plurality of well-defined arcs, each of the arcs having substantially different arc center for delivering energy with maximum efficiency to the inner core meeting the limitation of:

$$(1-L/r1)(1-L/r2)<0,$$

or $$(1-L/r1)(1-L/r2)>1;$$

where r1 and r2 is the arc radius of the inner cladding surfaces that are opposite to each other (mirror pair), with the radius of a concave mirror being positive and that of a convex mirror being negative, L is the distance between two mirrors.

20 Claims, 25 Drawing Sheets

CLADDING PUMPED FIBER LASER

CROSS REFERENCE TO RELATED APPLICATIONS

This application claims priority from Provisional Patent Application 60/294,092, filed May 29, 2001 entitled Cladding Pumped Fiber Laser.

This invention relates to cladding pumped glass fiber lasers and, more particularly, to an arrangement for a fiber laser and/or amplifier for getting high gain at a short length.

BACKGROUND OF THE INVENTION

Although it is known that double cladding technique is effective in construction of high power fiber lasers, so far the technique has generally been considered ineffective for pumping three-level fiber lasers such as erbium amplifiers due to the high ground-state absorption. One solution for high power pumping is to use the single mode output from other fiber lasers such as disclosed by Grubb in U.S. Pat. No. 5,530,710 and by Ball et al in U.S. Pat. No. 6,031,849. However, this approach of using fiber lasers to pump erbium amplifiers is complicated and ineffective. The cost is also high because diode laser is used to make a fiber laser that is, in turn, used for EDFA pumping. A better solution is to make double cladding fibers that have more efficient structure.

Double cladding fiber relies on a multi-mode cladding for accepting and transferring the pumping energy to the fiber core along the length of the fiber. U.S. Pat. No. 4,815,079 assigned to Polaroid Corporation, improves the efficiency for pumping beams entering the core from the inner cladding by placing the core off-center within a circularly symmetric structure or by using a high cladding/core area ratio rectangular pump cladding enclosing a centrally-located core. The cross-sectional area of the multi-mode cladding has a first path across the area which passes substantially through the geometric center of whose length is substantially different from the length of a second path across the area which passes substantially through the geometric center, wherein second path is substantially perpendicular to the first path.

U.S. Pat. No. 5,533,163, assigned also to Polaroid Corporation disclosed the cross-sectional shape of the inner cladding in the form of non-rectangular, convex polygons. The design objective is uniform distribution of pump energy across the fiber cross section, assuming effective transfer. The disclosed polygons have the property that, if a plurality of the same polygons are used to tile a plane, all of the polygons will fit into the tiling such that no spacing will be present between adjacent polygons.

U.S. Pat. No. 5,966,491, assigned to Lucent Technologies, improves the property of an otherwise circular double cladding fiber by introducing longitudinal, parallel troughs for the symmetric inner cladding.

U.S. Pat. No. 6,157,763, assigned to SDL provides a double cladding fiber with an inner cladding that is non-circular. The cross-sectional shape is such that two perpendicular distances across the shape, each of which passes through a geometric center of a core of the fiber, are equal for all angular positions, just as for a circular double cladding fiber.

In these improvements of double cladding fiber, the radiation localized in the cladding due to the local mode can not pass through the single mode inner core, causing low efficiency of the fiber, and leading to the necessity of using long length of fiber in device construction. In practice, the required length of the commercial double cladding fibers with above-mentioned Polaroid or Lucent structures is over 50 meters in the construction of a fiber laser. One of the consequences of the long length is low tolerance to the attenuation coefficient, and the fibers must be made with the expensive deposition process (MCVD) so that the transmission loss can be minimized. These large cladding dimensions also led to the conclusion that double cladding is not effective for pumping three-level fiber lasers such as erbium amplifiers. The low efficiency of the cladding structure also limits the use of many useful glass materials for making fiber lasers, because poor performance (such as high loss due to absorption) will be obtained. One example is shown by the unsatisfactory performance of a double cladding laser fiber with doped phosphate core and conventional cladding design similar to Polaroid design due to high loss and low efficiency (J. D. Minolly, et al IEEE Photonics Technology Letters, v.5. 1993. 301; R. Wu, Opto Southwest 2000).

BRIEF SUMMARY OF THE INVENTION

Thus, there is a need for better double cladding structures so that more available materials can be used effectively in double cladding fiber lasers. Better fiber structures could lead to easy fabrication and low cost. This is important for low cost, high power EDFAs and other fiber lasers. Better structure will also enable the construction of other amplifiers that could operate within the window used for optical communication. An approach that would allow an increase in the active core diameter and/or decrease in the inner cladding cross section would represent a significant advance in this technology.

Accordingly, it is the principal object of the present invention to provide efficient laser fibers having a novel cladding structure and arrangement.

It is another object of the present invention to use the novel cladding structure for making high power fiber laser or erbium doped fiber amplifiers with high gain using a short fiber. High pumping efficiency and low cost can be achieved.

It is yet another object of the present invention to use the invention in making other fiber laser or rare earth doped fiber amplifiers operating within the interested wavelength window for optical communication.

In accordance with the present invention, rare-earth doped glass, selected from silica, silicate, fluorozirconate, phosphate, fluroberyllate, fluroaluminate, flurophosphate, borate, germanate, tellurite, borosilicate, phosphosilicate, germanosilicate, lead germanate, or chalcogenide, is used as the inner core for double cladding glass fiber with high efficiency inner cladding.

In accordance with the present invention, the geometry of the inner cladding of a double cladding fiber is designed to avoid local mode so that the double cladding fiber can be used for fiber laser and amplifier to provide high gain at a short fiber length.

To achieve the foregoing and other objects, and in accordance with the purposes of the present invention, as embodied and broadly described herein, a preferred double cladding fiber comprises an inner core surrounded with an inner cladding with a cross-sectional shape that is unstable to local-modes and an outer cladding disposed adjacent the inner cladding. The inner core is doped with active species such as rare earth ion. The characteristics of the unstable cladding is that the clad cross section is encircled by several arcs, and any opposite arcs (mirror pairs) satisfy unstable cavity conditions:

$(1-L/r1)(1-L/r2)<0$, or $(1-L/r1)(1-L/r2)>1$;

where r1 and r2 are the arc radii of the inner cladding surfaces that are substantially opposite to each other (mirror pair), with the radius of a concave mirror being positive and that of a convex mirror being negative, L is the distance between two mirrors. The cyclic stability of beams in inner cladding can be further destroyed by shifting the centers of the arcs. Said inner cladding, generally called unstable inner cladding below, may be square-like, rectangular-like or polygon-like. A double cladding fiber with such inner cladding is generally called unstable double cladding fiber in the description below.

Also to achieve the foregoing objects, the area ratio of the inner cladding (no matter what shape) to the inner core of a double cladding fiber is preferably smaller than 200, more preferably smaller than 50, and further preferably smaller than 10 so that local modes can be minimized.

To achieve the foregoing and other objects, and in accordance with the purposes of the present invention, as embodied and broadly described herein, a preferred fiber laser or fiber amplifier may comprise a pumping source and an unstable double cladding fiber.

In accordance with the present invention, the diode laser becomes effective for pumping three-level double cladding fiber lasers when an unstable double cladding fiber is used. Thus, this technique can be used to directly pump an important class of devices that includes erbium fiber amplifiers and other three-level fiber lasers.

According to the present invention, a preferred laser amplifier (such as a Raman amplifier) for optical communication may comprise an input fiber for propagating optical signal, an output fiber for propagating amplified optical signal, an unstable double cladding fiber interposed in the path between said input and output fibers for amplifying said optical signal propagated between said input and output fibers, a diode laser array pumping source with coupling optics for injection of pumping laser beam into said unstable double cladding fiber amplifier.

According to yet another aspect of the present invention, a preferred fiber laser may comprise an unstable double cladding fiber, a diode laser array pumping source with coupling optics for injection of pumping laser beam into said unstable double cladding fiber, and having reflector at both end of the unstable double cladding fiber.

Additional objects, new features and advantages of the present invention will be set forth in part in the following description. Further scope of applicability of the present invention will become apparent from the detail description of the invention provided hereinafter. It should be understood, however, that the detailed description of the invention and the specific examples presented, while indicating preferred embodiment of present invention, are provided for illustration purposes only, because various changes and modifications within the scope and spirit of the present invention will become apparent to those of ordinary skill in the art from the detail description of the invention that follows.

This invention provides a novel inner fiber cladding structure that avoid local mode and that allows the pumping beam enter the fiber core of a double cladding fiber with high efficiency, which allows highly doped glass be used as the fiber core eliminating the need of the expensive MCVD process and enables the fabrication of three level double cladding pumped erbium doped amplifiers.

BRIEF DESCRIPTION OF THE DRAWINGS

The accompanying drawings serve to explain the principles of the invention, in which.

DETAILED DESCRIPTION OF THE INVENTION

Figure 1:
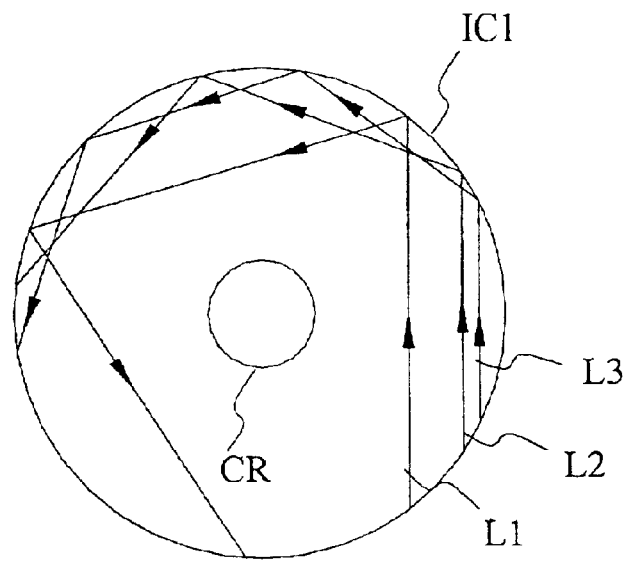
FIG. 1 shows a prior art inner cladding and the local modes.

In the present invention, the methods and apparatus for performing efficient pumping are disclosed so that high efficient fiber laser or fiber amplifiers can be made. In particular, new cladding structures for double cladding fibers are disclosed. The new structure features small clad/core ratio and novel clad geometry that is unstable for local mode so that local mode in the inner cladding can be substantially avoided. High gain and high efficiency thus can be achieved at a short fiber length and glass fiber cores highly doped with active species can be used. More specifically, the new cladding structures are used together with high brightness pumping source. With the disclosed fiber, devices previously believed impractical, such as diode laser directly pumped high power erbium doped double cladding fiber amplifiers, can now become practical. Such new fiber structures also allow the construction of the fiber amplifiers operating at other wavelength (such as 1.3 µm) that are interested for optical communications and that has been long desired.

It has been recognized for some time that for particularly high-power lasers, it may be desirable to provide optical amplification using a double-clad fiber. A typical double-clad fiber has an inner core doped with active species (such as Nd, Yb, Er, Pr, Ho, Tm), through which an optical signal is transmitted, an inner cladding surrounding the core that is of lower refractive index than the core, and an outer cladding surrounding the inner cladding that has a lower refractive index than the inner cladding. When using a double-clad fiber for optical amplification, it is known that the optical pumping energy need not be coupled directly into the core, where it will be absorbed for amplification purposes, but may be coupled into the inner cladding, where it propagates in various reflective trajectories through the cladding until it intersects the core. Once contacting the core, pump energy is absorbed and provides stored energy in the core for stimulated emission amplification of the optical signal. In that way, absorbed multimode power is converted into a single-mode laser emission within the fiber core. In order to facilitate coupling of high pump power into cladding pumped fiber lasers (CPFL), it is typically necessary to use fiber with relatively large cladding diameter, e.g. more than 250 μm (high aspect ratio). On the other hand, the conventional requirement of single mode output of the CPFL limits the core diameter of the CPFL to less than about 8 μm. The area aspect ratio is large, often over 500. This disparity in area between cladding cross section and core cross section necessitates long device length (up to 200 meters) since absorption of pump radiation in the CPFL structure is proportional to the ratio of core-to-clad cross section area. For many applications, this is an effective technique for supplying a relatively high-power pumping signal to a single-mode fiber laser.

Thus far, the application of such fibers for fiber amplifiers, however, has met problems. Essentially, direct pumping of such laser fiber, such as the three-level erbium doped fiber laser, for making EDFA's has been concluded to be impractical. The direct pumping of double cladding erbium doped fiber for EDFA application will be greatly beneficial.

During our research of amplifiers, we found that not only fiber length of fiber laser scales well with clad-to-core ratio, pumping power density and losses in the fiber also scale with the clad-to-core ratio. Contrary to the common belief in the art, we discovered that diode laser can be used to direct pump double cladding rare-earth doped amplifiers with high power density by correct selection of inner cladding parameters (dimension and shape) and by correct selection of inner core parameters. Since diode laser cladding pumping has been believed to be not effective for pumping three-level fiber lasers, this invention provides a method for directly pumping an important class of devices that includes erbium fiber amplifiers and other three-level fiber lasers. Since absorption of pump radiation in CPFL structure is proportional to the doping concentration, fiber length of a fiber laser also scales with rare earth doping concentration and therefore, high doping concentration is preferred.

Based on the present invention, compact inner cladding with unstable clad geometry that substantially avoid local mode can also be used with rare earth doped glass inner core in the construction of laser fibers. By using such laser fibers for fiber amplifiers, such as erbium doped fiber amplifiers, high gain and high efficiency can be realized at short fiber length and the amplifiers can be directly pumped with diode laser array. The glass fiber will be less expensive than conventional silica based fiber to fabricate because, unlike conventional low-loss communication fibers, procedures such as MCVD are not necessary. Moreover, in conventional EDFA, the silica-based glass fiber could only have very low Er concentration, such as $10^{19}$ cm$^{-3}$, and length of fiber must be 20 m–60 m to absorb pumping power and to optimize the amplifier. With the disclosed fiber structure, however, other non-silica-based glass can also be used so that high doping concentration can be achieved. Although the attenuation of such glass is larger than conventional silica-based fibers, this is compensated by the shorter fiber length brought by the compact and/or unstable inner cladding structure and high doping.

On the other hand, when silica-based glass fiber is used, its refractive index can not be changed freely. Therefore, it is difficult to decrease the NA of the core to increase core diameter and it is also difficult to decrease the clad diameter and fiber length by increasing cladding NA. By using non-silica-based glass, the refractive index can be selected from a large group of candidate glass so that the desired fiber parameter can be obtained easily. The performance of the laser fiber will then be further improved.

FIG. 1 shows the local mode (exemplified by L1, L2, and L3) in a prior art fiber inner cladding. The cross-section of the inner cladding IC2 has a circular geometry. CR is the core and d0 is the core diameter and d1 is the clad dimension (not shown).

Figure 2:
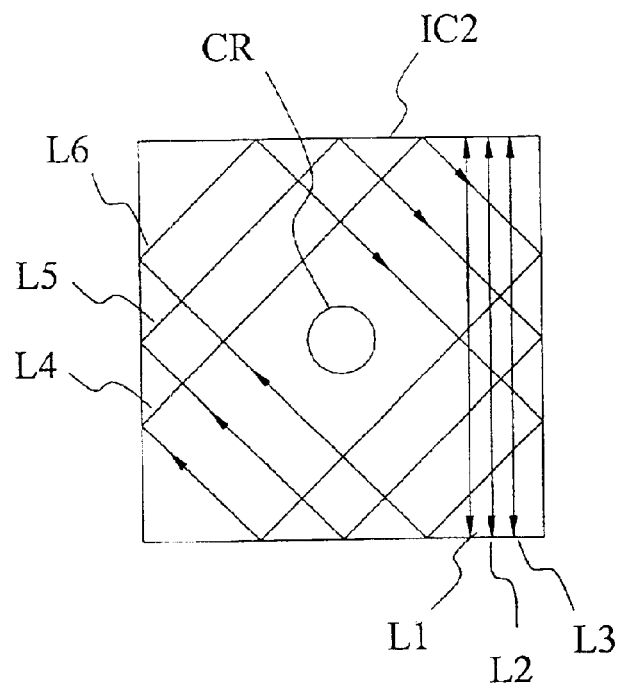
FIG. 2 shows a square inner cladding and the local modes.
Figure 3:
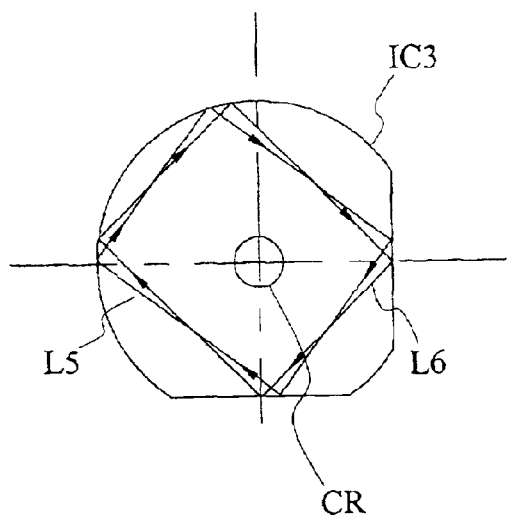
FIG. 3, FIG. 4 and FIG. 5 illustrate the local modes in a modified circular inner cladding, respectively.
Figure 4:
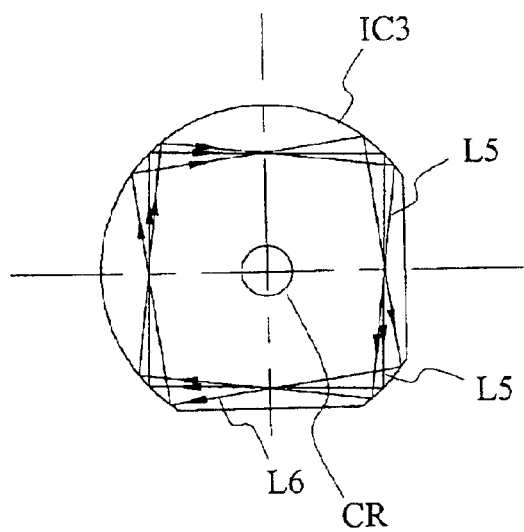
Figure 5:
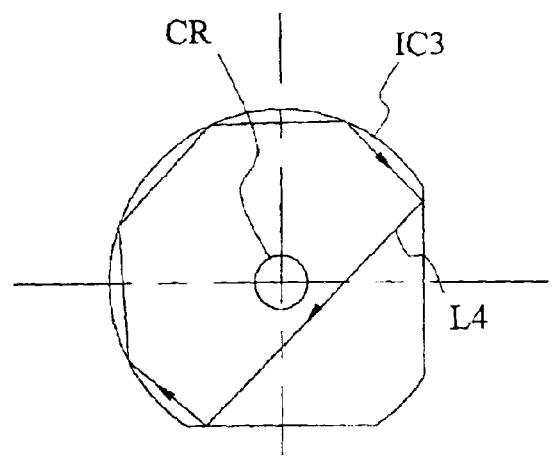

The prior art square or rectangular clad geometry also has a significant amount of local modes. FIG. 2 shows a square inner cladding IC2 where the local modes are exemplified by L1, L2 and L3, in which the positions of some rays are always the same. In this square cladding, L4, L5, and L6 are also unchanged rings, but the local mode number is much less than in circular situation given the same d1/d0 ratio, where d1 is the side length of square. FIGS. 3, 4 and 5 illustrated the local modes in another prior art inner cladding IC3, where the boundary symmetry causes cyclic stable local modes.

Figure 6:
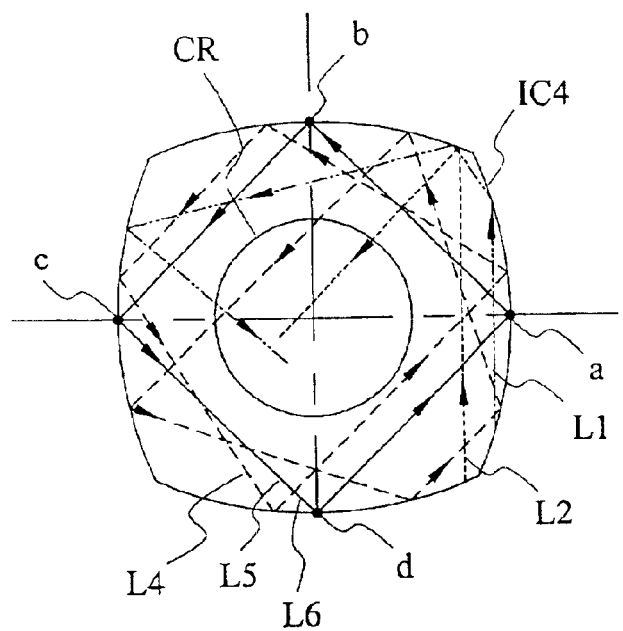
FIG. 6 shows a square-like inner cladding with its boundary being four arcs, in which the local modes are significantly reduced.

We found that if arcs are introduced into an otherwise square cladding, local modes can be reduced. FIG. 6 shows an embodiment of an inner cladding IC4, in which a square-like shape is obtained by modifying the edges of a square preform into arcs during the fiber fabrication, where a, b, c, d are the centers of the arcs, and each center coincide with the vertex of the arc in the opposite side. Although in this case, L1, L2 are stable local mode, they can pass the center core. Since the lines linking arc centers (vertex) a, b, c, d form a square, light paths L4, L5, and L6 form a stable ring that does not pass the core. But major improvement has been made comparing with a square inner cladding.

Figure 7:
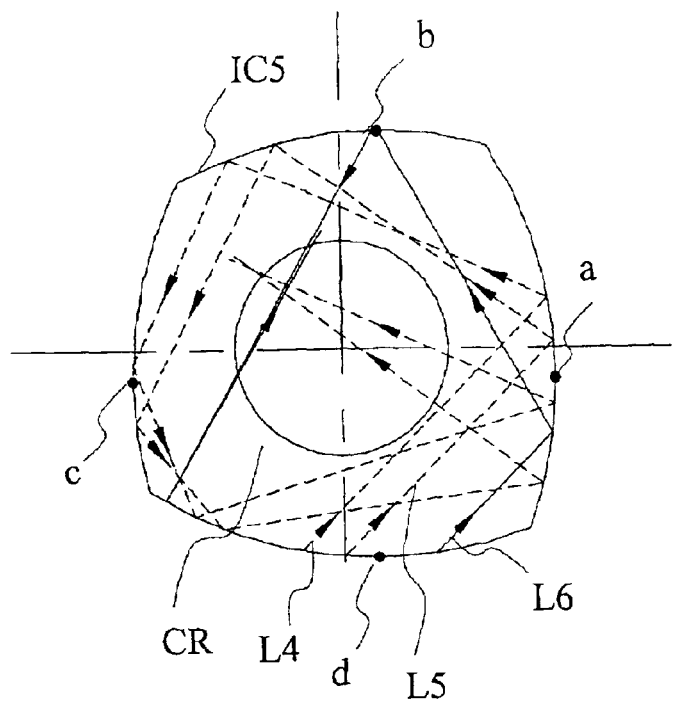
FIG. 7 shows an embodiment of a square-like inner cladding that is formed by modifying the inner cladding in FIG. 6 by shifting the arc centers.

Another embodiment based on the shape in FIG. 6 is illustrated in FIG. 7, in which cladding shape is further optimized. In this inner cladding IC5, the centers of arcs are shifted slightly from the vertex of the opposite arc. The arc centers a, c are shifted downwards from the vertex positions along arcs C and A, respectively; and centers b and d are shifted towards the right hand side slightly from the original vertex position comparing with the shape in FIG. 6. As a result, the light path L4, L5 and L6 become no longer stable. This preferred cladding shape was studied in detail for demonstration of the effectiveness. Essentially, no cyclic local mode can be stabilized in the inner cladding with this shape. The preform was ground with conventional optical process from a square cross section into a square-like, asymmetric cross section with arc edges, in which the asymmetry was formed by shifting the arc centers.

Figure 8:
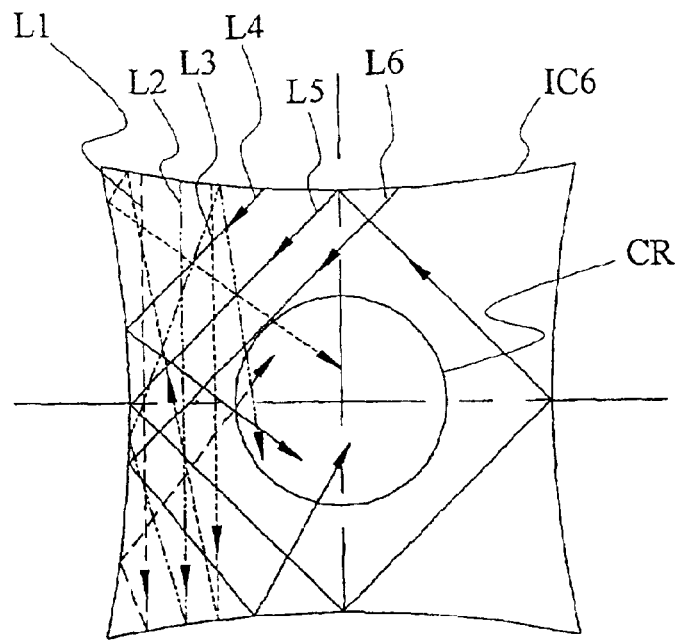
FIG. 8 shows an embodiment of a square-like inner cladding in which the local modes are destroyed.

According to the theory of laser cavity, unstable cavity does not generate stable local modes. FIG. 8 shows yet another embodiment of inner cladding IC6 with a clad cross section comprising four convex cylindrical mirrors. All beams diverse sequentially along with multiple reflections. No stable mode can exist.

Based on the theory of resonator, in the above embodiments, it is preferred that the dimension of the arcs meets one of the following unstable cavity conditions:

$$(1-L/r1)(1-L/r2)<0 \qquad (1)$$

or $$(1-L/r1)(1-L/r2)>1 \qquad (2)$$

where r1 and r2 is the radius of the arc (mirror) surface with the radius of a concave mirror being positive and that of a convex mirror being negative, L is the distance between two opposite mirrors. Thus, although the cladding shape in FIG. 6 is much better than square one due to the reduced amount of local mode, since L=r1=r2, and (1−L/r1)(1−L/r2)=0, it is cladding. The clad geometry of FIG. 8, however, satisfies the conditions represented by Eq. (2), where L/r1<0 and L/r2<0. By analogy, it is apparent that the modes in a clad cross section formed with two pairs of concave mirrors satisfying condition in Eq. (1) can also be unstable.

Figure 9:
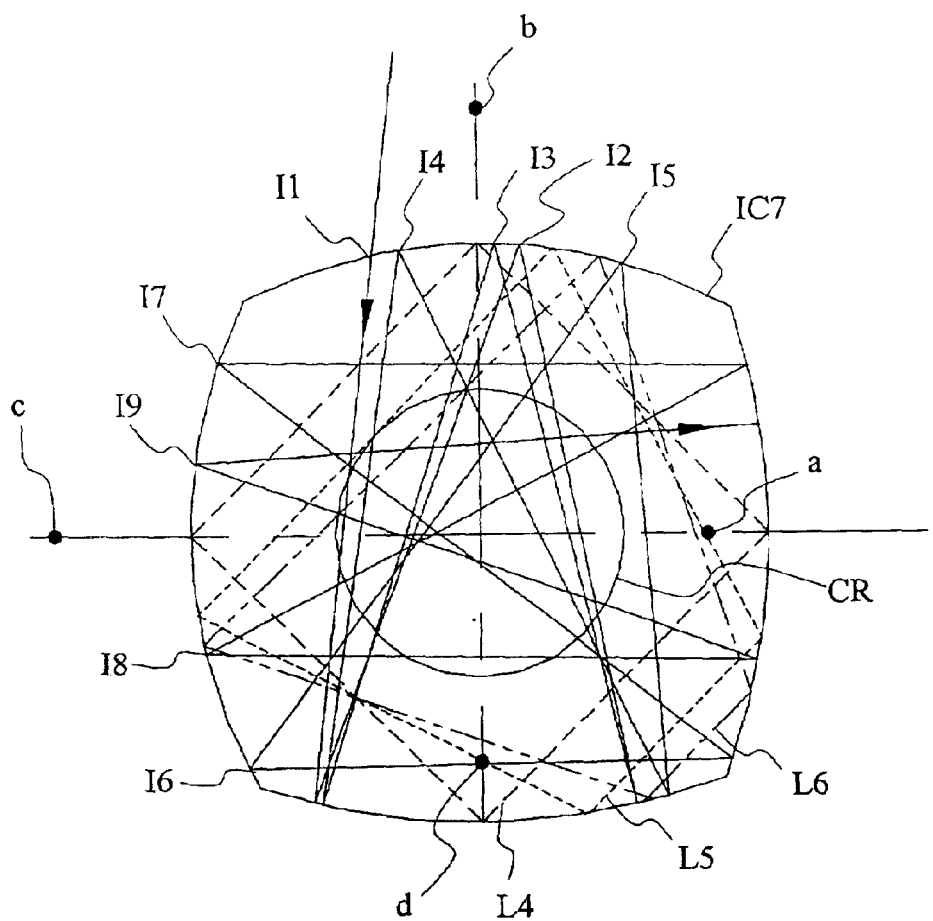
FIG. 9 schematically illustrates the beams traveling in another embodiment of square-like inner cladding.
Figure 10:
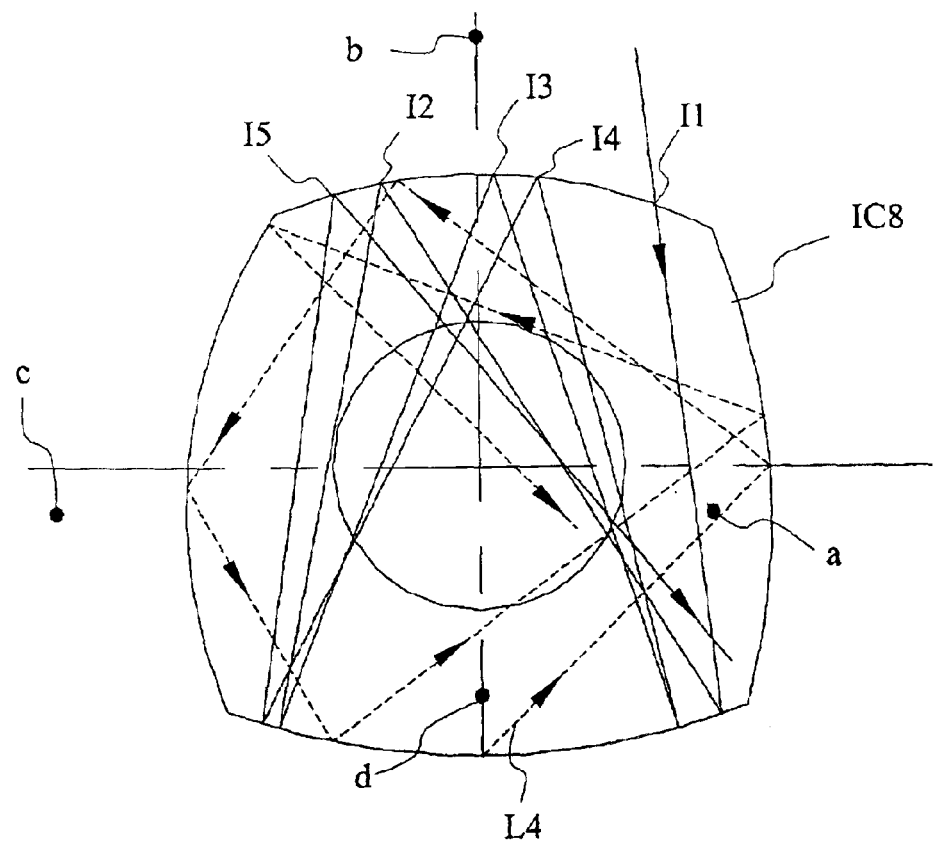
FIG. 10 shows yet another embodiment of unstable inner cladding of this invention in which the local modes are destroyed.
Figure 11:
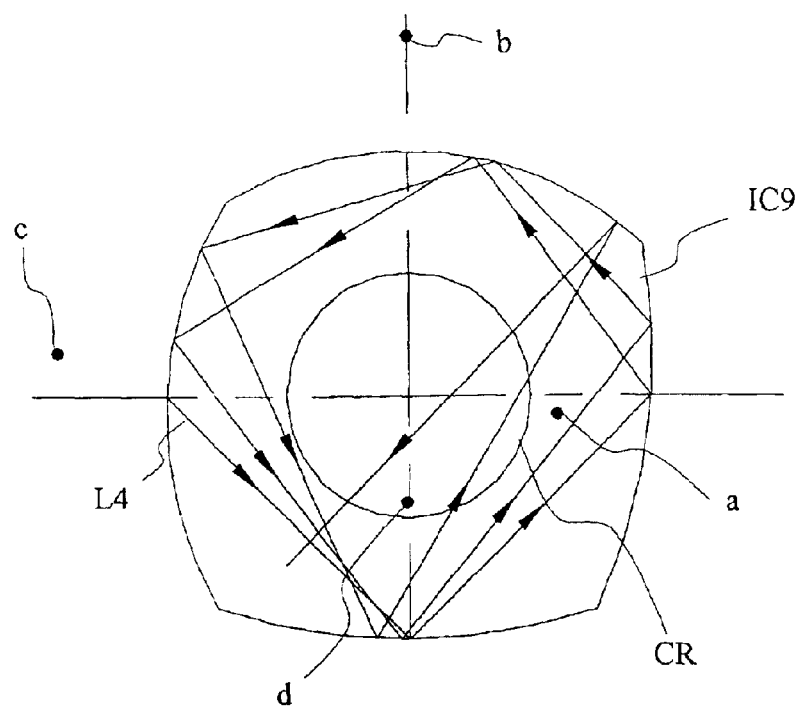
FIG. 11 and FIG. 12 are the cross sections of another two embodiment inner claddings of the current invention.
Figure 12:
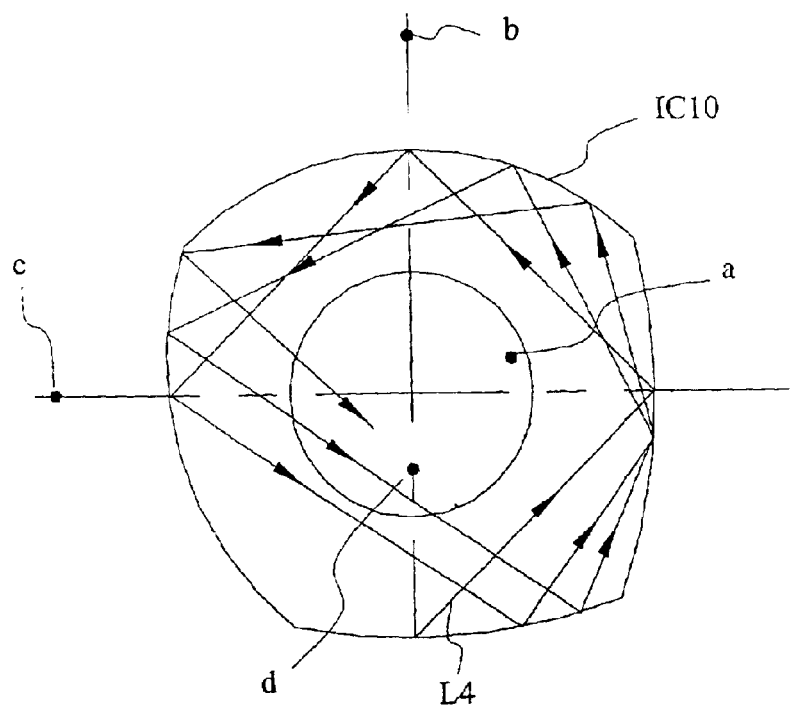

FIG. 9 shows still another embodiment of an inner cladding IC7, in which the arc centers are located off from the opposite arcs. The line linking arc center a, c is perpendicular to the line linking b, d. The geometry satisfies condition r1>L>r2>0 and equation (1). Beam I1 reflects sequentially, and also diverges sequentially into I2, I3, I4, I5, and then converges gradually into I6, I7, I8 and I9. Minimal amount of beams such as light paths L4, L5 and L6 still have certain stability, since the lines linking arc vertex form a square (light paths L4). To further eliminate such cyclic stability, the arc centers b and d can be shifted in the same direction into the locations shown in FIG. 10 for inner cladding IC8, or shifted in the opposite direction as shown in FIG. 11 for inner cladding IC9. In these cases, light path L4 becomes unstable. In fact, the "parallel" or "perpendicular" relation between the edges and the cyclic stability can be destroyed by just shifting of one of the arc centers as shown by the embodiment in FIG. 12 for inner cladding IC10.

Figure 13:
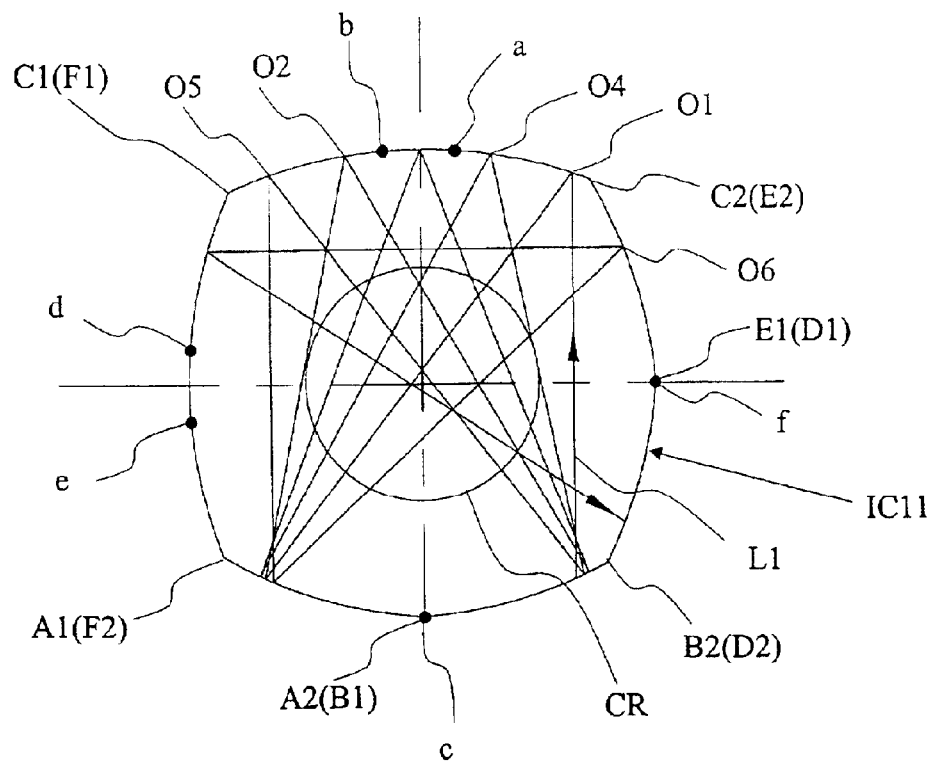
FIG. 13 and FIG. 14 show two embodiments of unstable square-like inner cladding having multi-imaging boundaries.
Figure 14:
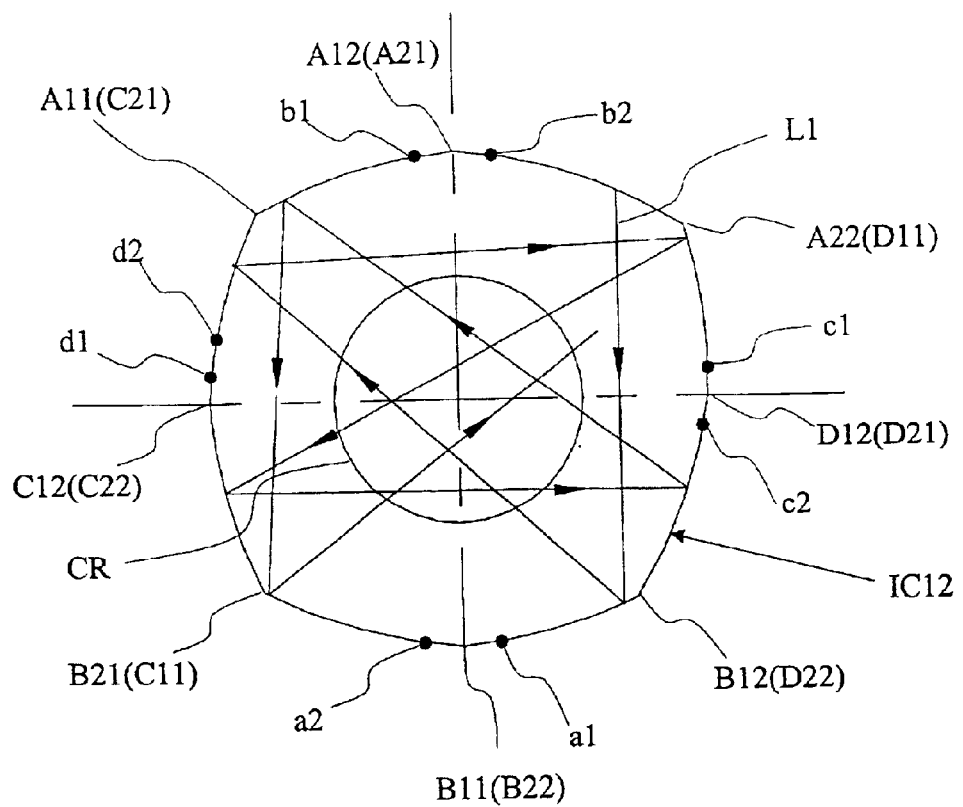

The embodiment shown in FIG. 13 is an unstable inner cladding IC10 having multi-imaging cavities, where a,b,c are the centers of arcs A1A2, B1B2, and C1C2, respectively. In this case, the radii of these three arcs are the same. It can be seen that after 4 reflections (one period), object point O1 shifts a distance 2q on mirror C1C2, where q is the distance between arc centers a and b. The beam continues to shift towards center after multiple reflections and further shifts towards outside after passing through the center. However, the positions of beam on A1A2 and B1B2 mirrors are substantially not changed. The embodiment in FIG. 14 shows another multi-imaging unstable inner cladding IC12 comprising eight mirrors (A11A12, A21A22, B11B12, B21B22, C11C12, C21C22, D11D12, D21D22), in which a1, a2, b1, b2, c1, c2, d1, d2 are the arc centers for mirrors A11A12, A21A22, B11B12, B21B22, C11C12, C21C22, D11D12, D21D22, respectively. In this embodiment, beam O1 shifts 2q1 on mirror B21B22 after four reflections and shifts 2q2 on mirror A21A22, where q1 is the distance between centers a1 and a2, and q2 is the distance between centers b1and b2. As a result, the beam at the edge of the cladding will continue to shift towards the center and then towards the edge again causing the destruction of local mode. In FIG. 14, the deviation of d1 and d2 from the axis also destroys the cyclic stability of beams traveling in the cladding.

It is well known that the magnification m of the unstable cavity follows:

$$m=(2g_1g_2-1)\pm[(2g_1g_{2-1})^2-1]^{1/2}$$

where $g_1=1-L/r_1$, $g_2=1-L/r_2$. If m approaches to ±1 (g1g2→1, or g1g2→0), the cavity approaches to be stable. If m is very different from ±1 (that is, g1g2>>1, or g1g2<<0), the beam will diverse more quickly. According to the clad-to-core ratio d1/d0, we can select appropriate m and appropriate amount for arc center shift so that the number of reflection can be minimized before the beam enters the core.

The unstable inner cladding (cavities) satisfying Eq. (1) and (2) can take many shapes and parameters that are different from those embodiments shown above. In fact, any clad cross section that is encircled by several arcs with any of the substantially opposite arc pair (mirror pair) satisfies the unstable cavity conditions can be used as efficient inner cladding. The embodiments disclosed above shows mainly square-like shapes, For the skilled in the art with the understanding of above principle, it is obvious that any quadrangular shapes (such as rectangular, trapezoid, rhombus) or any polygons can be modified to become quadrangular-like shapes (such as rectangular-like, trapezoid-like, rhombus-like) or polygon-like shapes by modifying the boundaries into well defined arcs, forming unstable cladding shapes. The cyclic stability of local mode in the inner cladding can always be further destroyed by shifting the arc center to alter the symmetry of the cladding.

According to the theory of resonator, unstability of a cavity only depends on the curvature near the vertex. Any curved edges such as sphere, hyperboloid, paraboloid, ellipsoid or other high order surface is the same in this respect. We found that the same principle applies for unstable inner cladding. The arcs of preceding description, therefore, can be any curve as long as its radius of curvature near the vertex satisfies condition (1) or (2).

With the unstable geometry, light paths are ergodic within the clad. Each beam can enter the core without perturbation, but must through multi-reflection on the clad boundary. Generally speaking, the average number of reflection will scale with d1/d0.

Figure 15:
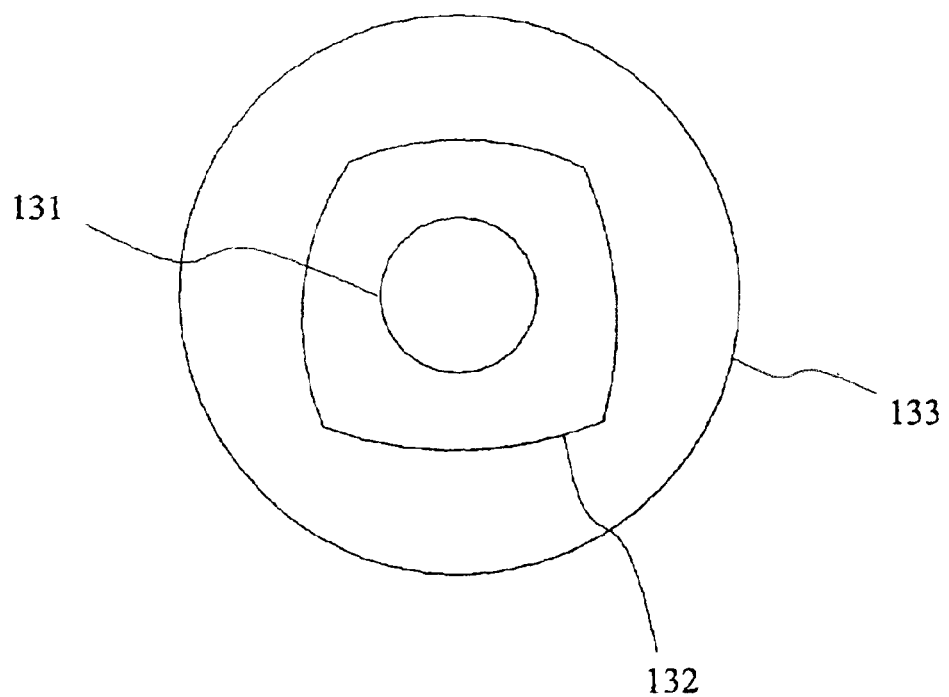
FIG. 15 schematically illustrates an embodiment of an unstable double cladding fiber with its inner cladding having the geometry shape of the current invention.

With the inner cladding that destroys local modes, an efficient double cladding fiber can be made. FIG. 15 shows an embodiment of a double cladding fiber structure comprising an inner core 131 for providing single mode transmission of the laser signal and first cladding (inner cladding) 132 disposed adjacent the inner core for providing optical pumping beam into the inner core. The first cladding has a geometry that destroys local modes as shown in the embodiments disclosed above. The core can be selected from silica-based glass, silicate, fluorozirconate, phosphate, fluroberyllate, fluroaluminate, flurophosphate, borate, germanate, tellurite, borosilicate, phosphosilicate, germanosilicate, lead germanate, chalcogenide glass and other glass, doped with rare-earth ions. The doping concentration is not limited. A doping level that maximizes the performance and minimize the double cladding fiber length can be selected. The double cladding fiber also comprises an outer cladding 133 disposed adjacent the inner cladding having an index of refraction n2 less than that of the inner cladding n1 for confining the optical pumping beam; and the core having a refractive index n0 larger than n1 for confining the single mode signal.

The numerical aperture NA1 of inner cladding is $NA_1=(n1^2-n2^2)^{1/2}$, and the dimension of inner cladding is d1. It is well known that d1·NA1 determines the Lagrange invariant of inner cladding, and determines how much pumping power can be inject into it. According to the scaling rule d1 is as small as possible, so NA1 is as large as possible, and n1>>n2 is favored high pumping power injection.

Figure 15A:
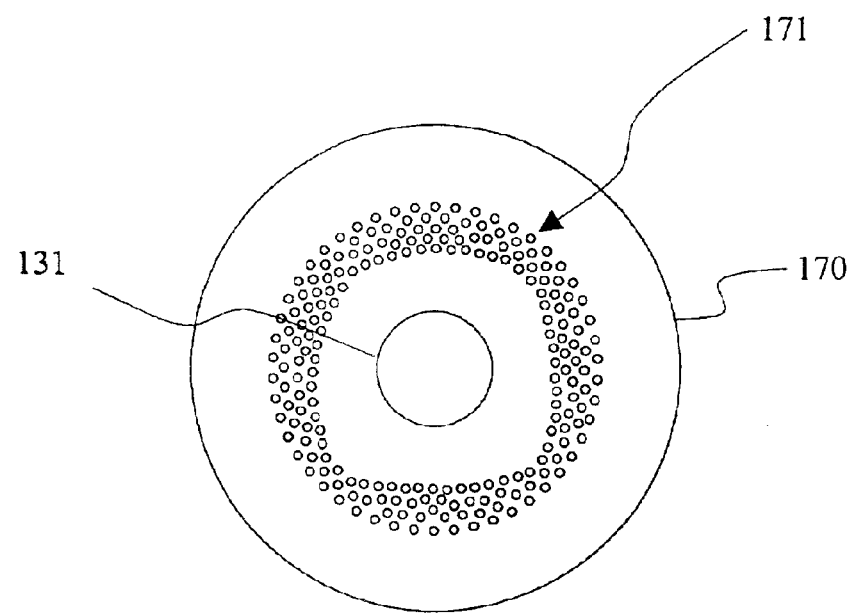
FIG. 15a and FIG. 15b show an embodiment of unstable double cladding fiber with photonic crystal outer cladding.
Figure 15B:
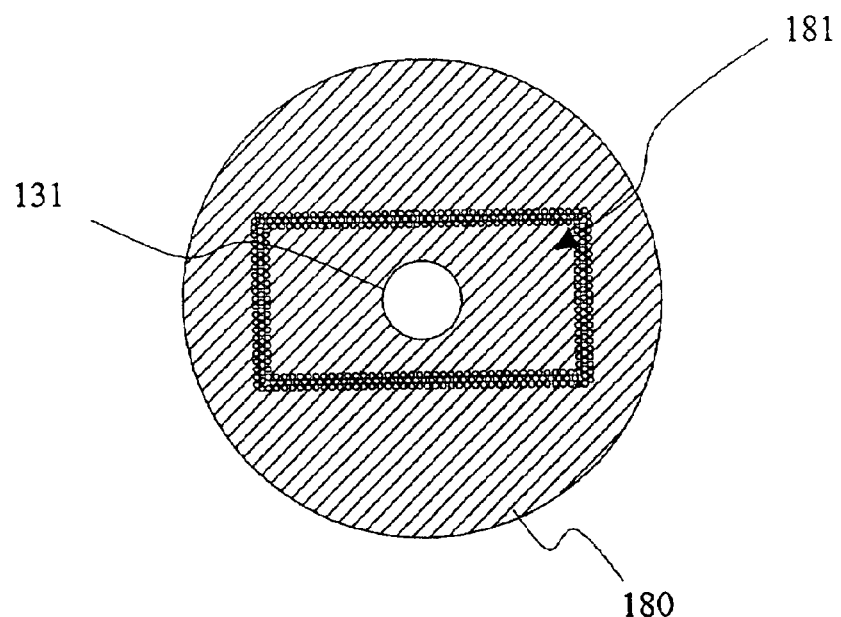
Figure 15C:
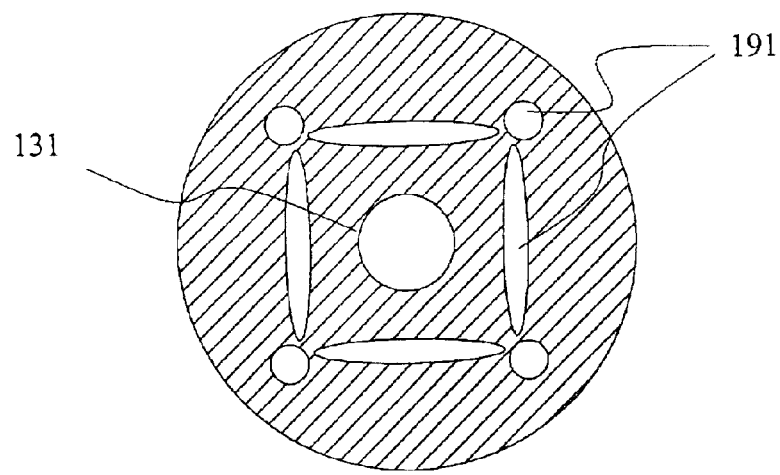
FIG. 15c, FIG. 15d, FIG. 15e, 15f and 15g shows five embodiment of using large holes to separate inner and outer claddings.
Figure 15D:
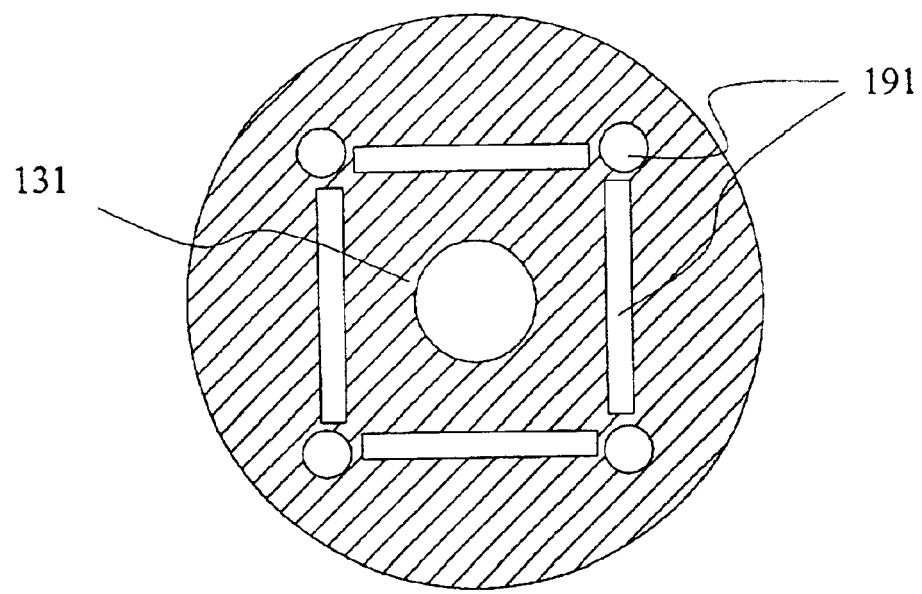
Figure 15E:
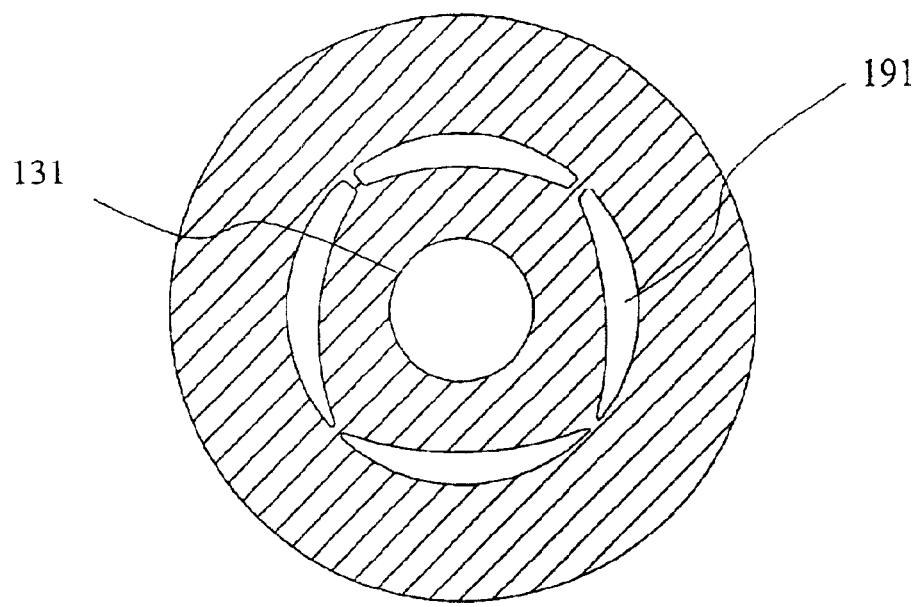

The outer cladding is often formed from a suitable polymer such as a fluoropolymer or from a conventional low-index glass. In any case, the index of refraction of the cladding is designed to be about <1.39 to maximize NA1. Diameter of outer cladding d2 is usually much larger than d1. For the sake of further lower the index of outer cladding, photonic crystal (photonic bandgap materials) can be used, that is a multi-micro-hollow periodic duck with much lower and effective refractive index. FIG. 15a shows an embodiment of unstable double cladding fiber 170 with photonic crystal outer cladding 171. The fiber has the same inner core as in FIG. 15, and the inner unstable cladding also has the same shape. However, the outer cladding of this embodiment consists of a regular array of microscopic air-holes running along the entire length of fiber and the boundary of the inner cladding is formed by the holes. It should be noted that it is only necessary to have the holes near the inner cladding. There are two main regimes of guidance exist. First, light is trapped by a modified form of total internal reflection. In the second, light is trapped by a full two-dimensional photonic band-gap. In FIG. 15a, there are only a few layers of those holes, and light is guided by modified total internal reflection. Therefore, the effective refraction index of the outer cladding equals one, and the dimension of inner cladding can be minimized when it is encircled by photonic crystals outer cladding. By using this "photonic crystal" approach, inner cladding of any shape can be made. For example, to the skilled of the art, it is obvious that a square, or rectangular, or polygon or the shapes disclosed in this invention can be formed by encircle the shape with a plurality of holes. A rectangular inner cladding 181 encircled by micro-holes is shown in the embodiment 180 in FIG. 15b. It should be noted that large holes 191 can also be used to define inner cladding shapes, as shown in FIG. 15c, FIG. 15d and FIG. 15e. One of the advantages of using micro-holes is that the inner cladding and outer cladding can have the same refractive index.

Figure 15F:
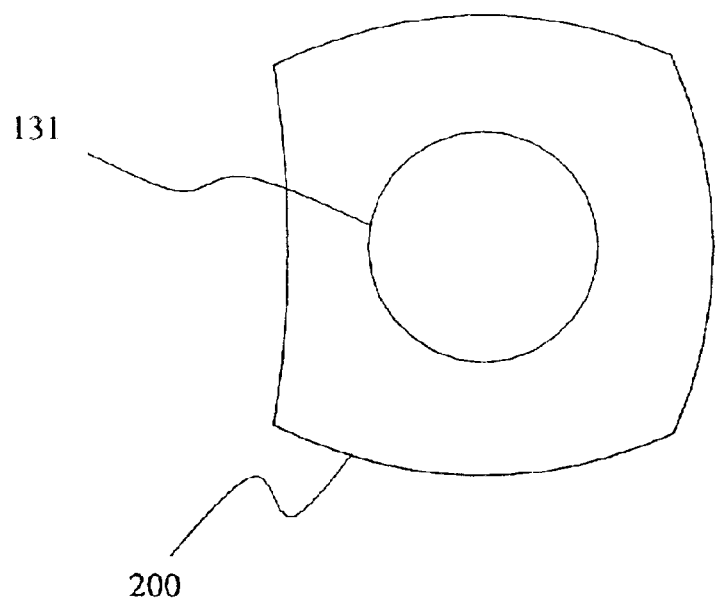
Figure 15G:
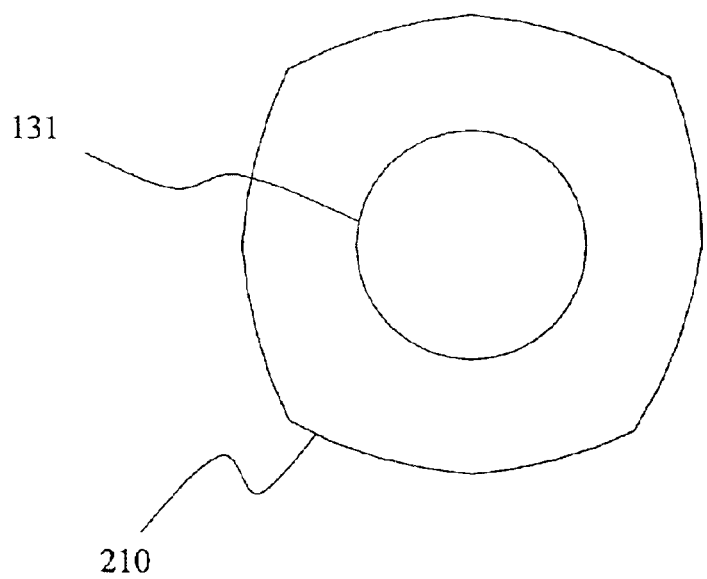

It is apparent that an unstable inner cladding (cavities) satisfying Eq. (1) or (2) can be formed with arcs having both concave and convex shapes (relative to the inner core) at the same time such as in the embodiment for inner cladding shape 200 shown in FIG. 15f. On the other hand, it is also apparent the number of arcs forming the unstable inner cladding satisfying Eq. (1) or (2) is arbitrary since the reflection surface in the unstable inner cladding varies continuously with traveling beams. FIG. 15g shows an embodiment of unstable inner cladding 210 that contains odd number (seven) arcs.

Figure 16:
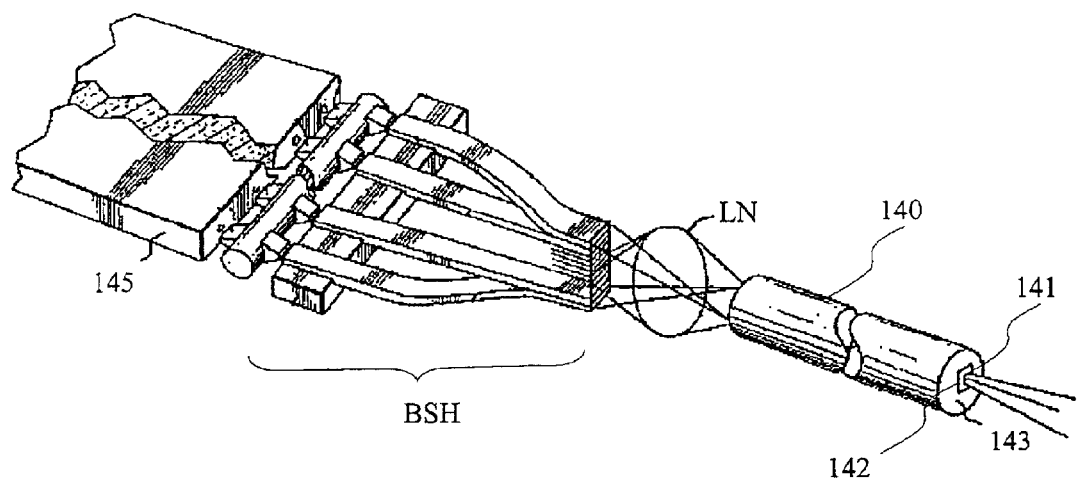
FIG. 16 illustrates a prospective view showing a cladding-pumped structure coupled to a laser diode array.
Figure 17:
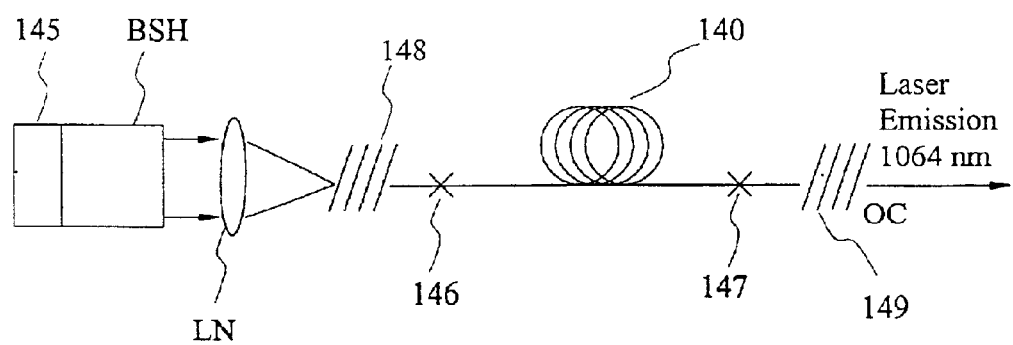
FIG. 17 schematically shows a demonstration of a fiber laser.

There are many known methods to use double cladding structure for making fiber lasers. FIG. 16 shows a well-known arrangement for coupling laser diode array 145 with a cladding-pumped structure 140, but substituting a preferred unstable double cladding fiber according to the current invention. The coupling optics for coupling beams of 145 into 140 comprises beam shaping optics BSH and focusing lens LN. The double cladding pumped structure 140 is constituted of a core 141 doped with active species, inner cladding 142 having an unstable inner cladding shape, and outer cladding 143. FIG. 17 shows the schematic illustration of a demonstration of a fiber laser 160. The unstable double cladding pumped structure 140 with a preferred inner cladding geometry of current invention was spliced at 146 and 147 to fiber Bragg gratings 148 and 149. Grating 148 has a high reflectivity (HR) for the output wavelength such as 1064 nm. Grating 149 has a moderate reflectivity such as 10% for the output wavelength, and serves as an output coupler (OC). Diode radiation is collected and focused by the beam coupling optics onto the aperture of grating 148. The coupling efficiency can vary with different beam coupling techniques. The assembly can also be pumped by means of a pigtailed laser diode (not shown) spliced to the HR grating 148. It is obvious to the skilled that a Raman resonator can be added at the fiber laser output OC so that a Raman laser can be built for amplification applications.

Figure 18:
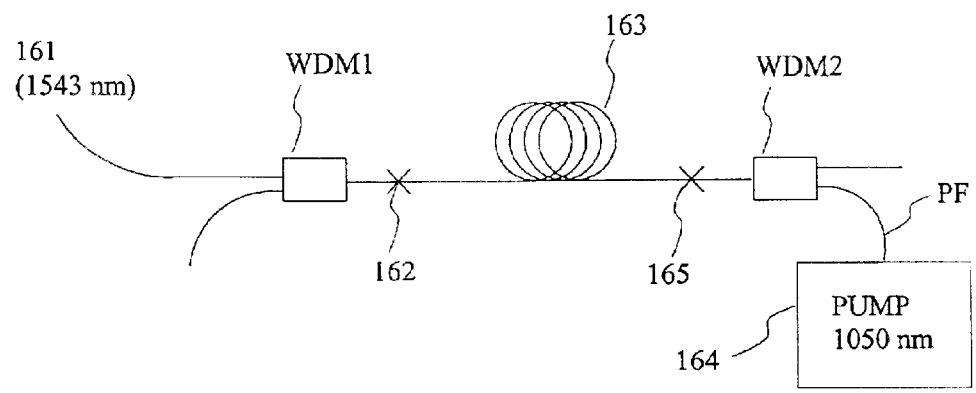
FIG. 18 is a schematic diagram showing a cladding pumped structure, serving as a pump or a rare earth doped fiber amplifier.

FIG. 18 show the schematic representation of a demonstration in which the unstable double cladding fiber of the current invention was used as a rare-earth doped fiber amplifier. The signal 161 to be amplified was introduced into the dichroic coupler WDM1 and through splice 162 into erbium-ytterbium-doped fiber amplifier 163. The cladding-pumped laser structure 164 was used as a counter propagating pump with emission introduced into amplifier 163 via fiber PF, WDM2, and splice 165. The amplified signals were collected at the output of WDM2.

In this invention, we also discovered that compact double cladding fiber with small inner cladding/inner core area ratio can further increase the fiber efficiency in amplifiers and fiber lasers exemplified in FIG. 16, FIG. 17, and FIG. 18. The area ratio of the inner cladding to inner core of the unstable double cladding fiber is preferred to be smaller than 200, preferably smaller than 50, and more preferably smaller than 10. Given diode pumping power Po, inner cladding dimension d1 should be as small as possible in order to achieve high pumping power density. By coupling high brightness LDA with optical fiber, >1 MW/cm$^2$/ster can be obtained. For example, when Po=1W, NA1=0.5, then d1=10 $\mu$m is enough. d1 can be selected to be slightly larger so that WDM alignment is easier. Another example, Po=10W, d1=30 $\mu$m. Po=100W, d1=100 $\mu$m. So said compact inner cladding can be used for high power pumping. When the ratio is smaller enough, the efficiency can be increased for any double cladding fiber with inner cladding of any symmetric or asymmetric polygon shapes or polygon-like shapes or even the star shaped cladding disclosed in U.S. Pat. No. 5,966,491. When d1/d0 is close to 1, circular cladding is also suitable. According to the scaling rule, when d1 is smaller, the required fiber length will also be reduced accordingly in proportion. Loss can be reduces and cost can be lowered. The boost of pumping power density based on such unstable double cladding fiber is much higher than the specifications expected from Er 3-level pumping system and the power density can reach MW/cm$^2$. The efficiency of the unstable double cladding fiber can also be increased with such compact cladding double cladding fibers, no matter what geometry the inner cladding has. By replacing the double cladding fibers in FIG. 17 and FIG. 18 with a compact double cladding fiber having small inner cladding/inner core area ratio, the amplifiers and lasers can be made, whereas they are impractical otherwise due to the presence of local modes when double cladding fiber with regular large inner cladding/inner core area ratio is used.

The foregoing descriptions of embodiments of the invention have been presented for the purpose of illustration and description. It is not intended to limit the invention to the precise form disclosed, and obviously many modification and variation are possible in light of above teaching. For example, extra layer of cladding could be added to achieve certain specific purposes. For example, guiding clad can be added to facilitate the cleavage and splice of the fiber. Cut off some curve corner only have small influence on the optical path in the clad, such as cut off four small corner of square-like unstable clad, the resulted cross section will have more central symmetry. Also, the fabrication of the fiber can be carried out in many different ways as know to the art. The embodiments were chosen and described in order to best explain the principles of the invention and its practical applications to thereby enable others skilled in the art to best utilize the present invention. While specific values have been used and listed in the foregoing embodiments for the sake of easy to understand, they do not set limit on the invention teaching, which is properly described in the claims. The particular values and configurations discussed above can be varied and are cited merely to illustrate particular embodiments of the present invention and are not intended to limit the scope of the present invention.

What is claimed is:

1. Apparatus comprising:
   a double cladding fiber including,
   an inner core doped with active species,
   an inner cladding surrounding the inner core for receiving pumping energy, and transferring said pumping energy to the core;
   an outer cladding surrounding the inner cladding for protecting the inner cladding and maintain light within the inner cladding;
   the improvement to a cross-section shape of said inner cladding relative to the outer cladding for minimizing local modes in said inner cladding, the cross-section shape of the inner cladding comprising:
   a boundary between the inner cladding and the outer cladding with the boundary being at least three arcs;
   each of the arcs having substantially different arc center; and,
   each arc having a predetermined radius from the arc center of the arc;
   wherein the relative size of said inner core and said inner cladding is determined by an inner cladding/inner core area ratio, and wherein said inner cladding/inner core area ratio is selected from a ratio equal to x, where x is between 1 and 200, whereby the local modes in said inner cladding are substantially minimized.

2. Apparatus of claim 1 in which said inner cladding/inner core area ratio is smaller than 100.

3. Apparatus of claim 1 in which said inner cladding/inner core area ratio is smaller than 50.

4. Apparatus of claim 1 in which said inner cladding/inner core area ratio is smaller than 10.

5. Apparatus of claim 1 in which said inner cladding/inner core area ratio is smaller than 5.

6. Apparatus of claim 1 in which said core is made from a glass material selected from a group including silica, silicate, fluorozirconate, phosphate, fluroberyllate, fluroaluminate, flurophosphate, borate, germanate, tellurite, borosilicate, phosphosilicate, germanosilicate, lead germanate, or chalcogenide, doped with active species.

7. Apparatus of claim 1 wherein the inner core doped with active species forms at least a portion of an amplifier.

8. Apparatus of claim 1 wherein the inner core doped with active species forms at least a portion of a laser.

9. Apparatus of claim 1 in which the core contains erbium.

10. Apparatus of claim 1 in which the core contains erbium and ytterbium.

11. Apparatus of claim 1 further comprising an energy source coupled to the fiber.

12. Apparatus of claim 1 wherein any at least two opposing arcs in the boundary of said cross-section shape satisfy the unstable cavity conditions:

$$(1-L/r1)(1-L/r2)<0,$$

or $$(1-L/r1)(1-L/r2)>1,$$

where r1 and r2 are the arc radius of the inner cladding surfaces that are opposed to each other, with the sign of the radius for a concave arc with respect to inner core doped with active species being positive and the sign for a convex arc with respect to the inner core doped with active species being negative, and L is the distance between the two arcs.

13. Apparatus of claim 1 wherein:
   the boundary of said cross-section shape of said inner cladding with respect to the outer cladding includes at least four arcs; and,
   when two lines are drawn on a cross section of the inner cladding to connect the arc centers of two opposing pairs of arcs, respectively, the cross point of said two lines is eccentric to the center of at least one of the lines.

14. Apparatus of claim 1 wherein:
   said cross-section shape of said inner cladding has a boundary containing four arcs with two opposite arcs having lengths exceeding two intermediate arcs.

15. Apparatus of claim 1 wherein said cross section shape of said inner cladding has a boundary containing four arcs of substantially equal length.

16. Apparatus of claim 1 wherein said cross section shape of said inner cladding has a boundary containing five or more arcs.

17. Apparatus of claim 1 wherein a plurality of said arcs is concave to the inner core.

18. Apparatus of claim 1 wherein a plurality of said arcs is convex to the inner core.

19. Apparatus of claim 1 wherein the boundary of said cross-section shape of said inner cladding comprises even numbers of said arcs.

20. Apparatus of claim 1 wherein the boundary of said cross-section shape of said inner cladding comprises odd numbers of said arcs.

* * * * *